United States Patent [19]

Wiant

[11] Patent Number: 4,502,725
[45] Date of Patent: Mar. 5, 1985

[54] SEAL STRUCTURE FOR STORAGE CONTAINER

[75] Inventor: Morris N. Wiant, Wichita, Kans.

[73] Assignee: The Coleman Company, Inc., Wichita, Kans.

[21] Appl. No.: 365,631

[22] Filed: Apr. 5, 1982

[51] Int. Cl.³ .................... B65D 43/10; B60R 5/00
[52] U.S. Cl. ................................. 296/181; 220/356; 224/328; 296/156; 296/210
[58] Field of Search ............ 296/181, 171, 107, 210, 296/100, 24 R, 156, 168; 224/309, 328; 220/356, 357, 352

[56] References Cited

U.S. PATENT DOCUMENTS

| 3,210,118 | 10/1965 | Chieger | 296/181 |
| 3,252,730 | 5/1966 | Chieger et al. | 296/181 |
| 3,381,872 | 5/1968 | Holder et al. | 220/356 |
| 3,957,097 | 5/1976 | Swett | 220/356 |
| 3,992,052 | 11/1976 | Green | 296/181 |
| 4,341,324 | 7/1982 | Ramirez | 220/356 |
| 4,406,387 | 9/1983 | Rasor | 224/328 |

Primary Examiner—Richard A. Bertsch

[57] ABSTRACT

A storage container includes a base and a cover. The base provides a storage enclosure and includes a side wall, a rim on top of the side wall, and a flange which extends downwardly and outwardly from the rim. The cover includes a shoulder which is supported by the rim when the cover closes the base and a flange which extends outwardly and downwardly from the shoulder. The flanges on the cover and the base are flexible and engage each other when the cover closes the base to provide a seal between the cover and the base.

12 Claims, 8 Drawing Figures

SEAL STRUCTURE FOR STORAGE CONTAINER

BACKGROUND AND SUMMARY

The invention relates to storage containers, and, more particularly, to seal structure for storage containers such as vehicle trailers, car top cargo carriers, and the like.

Vehicle trailers or car top carriers commonly include an open-topped base which provides a storage enclosure and a cover which closes the top of the base. The cover and the base may be provided with seal means for sealing the cover and the base when the cover is closed. Conventional seals include foam plastic strips or molded plastic and rubber strips which are bonded or mechanically fastened to the cover and/or base.

The invention provides a seal structure which is integral with the cover and the base yet which is flexible to accommodate dimensional differences between the cover and the base. The cover may be integrally molded from plastic and includes a side wall with an outwardly extending shoulder and a downwardly and outwardly extending flexible flange. The base may also be integrally molded from plastic and includes a side wall with an upper rim and a flange which extends downwardly and outwardly from the rim. When the cover closes the base, the shoulder of the cover is supported by the rim of the base. The flexible flange of the cover engages the flange of the base as the cover is lowered over the base, and the flange of the cover is flexed slightly outwardly by the flange of the base to maintain good sealing contact between the flanges. The flange of the base may also be flexible to provide increased ability to accommodate dimensional variances. When the cover closes the body, the contact between the two flanges provides a seal against dust, water, and inclement weather.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
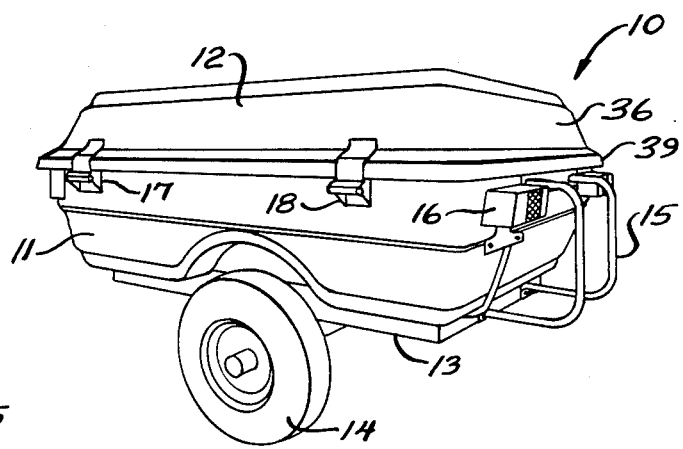
FIG. 1 is a perspective view of a vehicle trailer which is provided with a seal in accordance with the invention.
Figure 2:
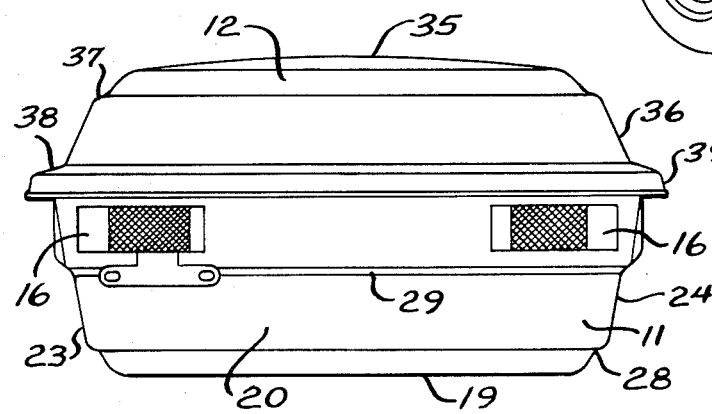
FIG. 2 is a rear elevational view of the trailer base and cover.
Figure 3:
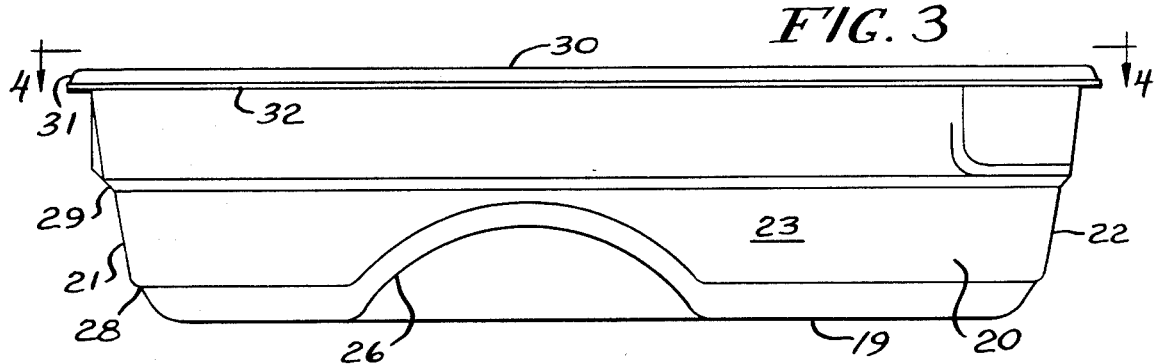
FIG. 3 is a side elevational view of the trailer base.
Figure 4:
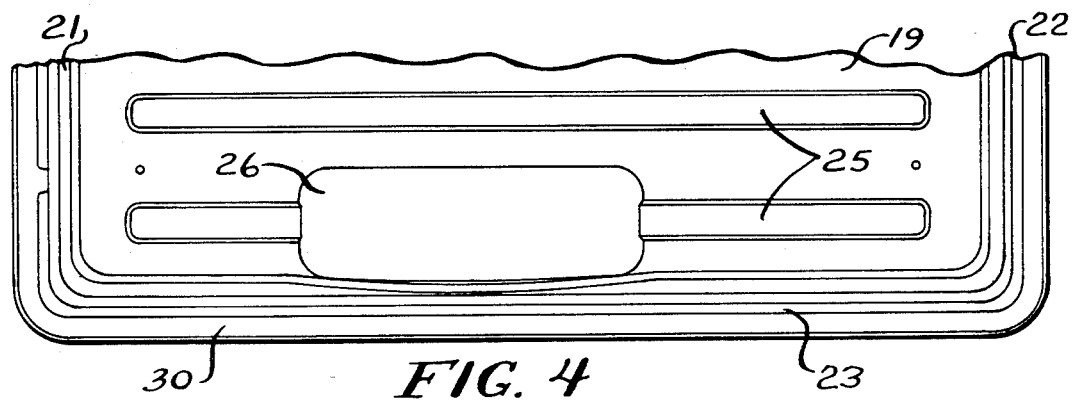
FIG. 4 is a fragmentary top plan view of the base as would be seen along the line 4—4 of FIG. 3.
Figure 5:
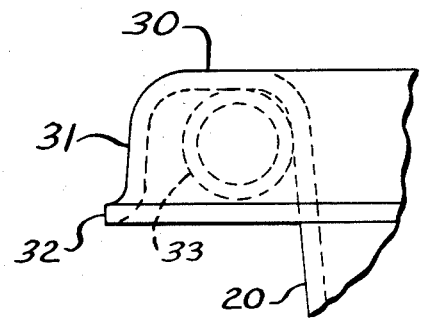
FIG. 5 is an enlarged fragmentary view of the upper rim and flange of the base.

The invention will be explained in conjunction with a vehicle trailer 10 shown in FIG. 1. It will be understood, however, that the invention can be used with other container bodies, such as car top cargo carriers and the like.

The trailer 10 includes a base 11 and a cover 12. The base is supported by a metal frame 13 and a pair of wheels 14, and a rear bumper 15 is attached to the frame and to the base. A pair of rear safety lights 16 may also be mounted on the trailer. The cover is hingedly attached to the base by a pair of side hinges 17 and 18.

The particular base illustrated is molded from plastic and is generally tub-shaped. The base includes a generally flat bottom wall 19 and an upwardly extending perimetric side wall 20. The side wall includes front and rear portions 21 and 22 and a pair of side portions 23 and 24. The bottom wall is provided with laterally spaced fore and aft recesses 25 for strengthening the bottom, and each side wall and the adjacent portion of the bottom wall is provided with a wheel well 26.

The side wall 20 diverges outwardly and upwardly and includes a pair of reinforcing steps or shoulders 28 and 29. The top of the side wall terminates in a rim 30 (see also FIGS. 5-8) which extends generally horizontally outwardly and a downwardly and outwardly extending flange 31. The lower end of the flange terminates in an outwardly turned bead or lip 32. The upper end of the side wall therefore provides a U-shaped channel, and a reinforcing metal tube 33 is secured within the channel against the upwardly extending portion of the side wall 20 and the rim 30. The base is advantageously integrally molded from plastic, and the downwardly extending flange 31 is therefore flexible and resilient. The flange 31 is spaced outwardly from the reinforcing tube and may be flexed inwardly.

The tub-shaped base provides an open-topped storage enclosure which may be closed by the cover 12. The cover is also generally tub-shaped and includes a slightly convex top wall 35 and a downwardly extending perimetric side wall 36. The side wall diverges outwardly and downwardly and includes a pair of reinforcing steps or shoulders 37 and 38. The lower end of the side wall terminates in a downwardly and outwardly extending flange 39 (see also FIGS. 6—8), and the flange terminates in an outwardly turned bead or lip 40. The cover is also advantageously molded integrally from plastic, and the flange 39 is thereby made flexible and resilient.

The dimensions of the base and the cover are such that when the cover is lowered over the base, the shoulder 38 of the cover will overlie and be supported by the rim 30 of the base. The flange 39 of the cover will extend downwardly alongside the flange 31 of the base and will engage the lip 32 of the flange 31 to provide a seal between the cover and the base.

Figure 6:
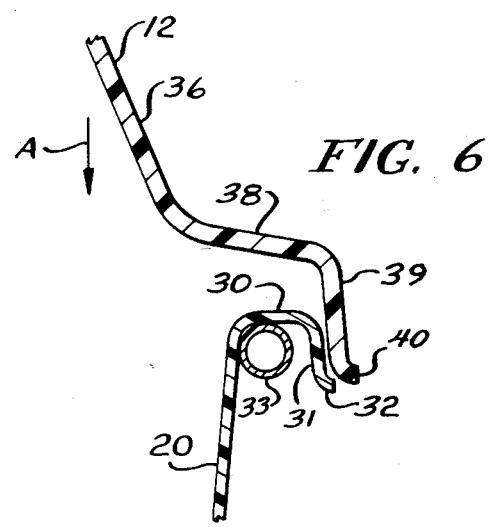
FIGS. 6 and 7 are fragmentary sectional views showing the cover being lowered over the base.
Figure 7:
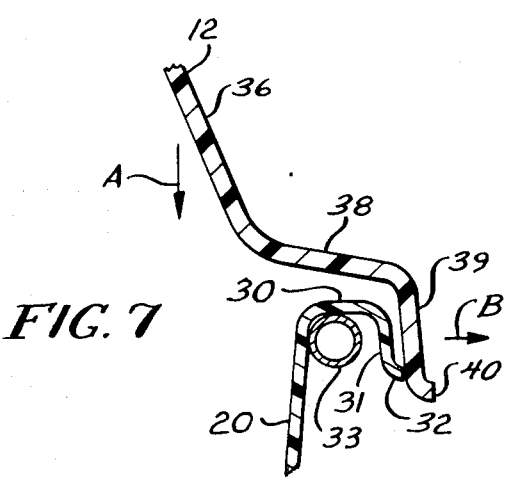
Figure 8:
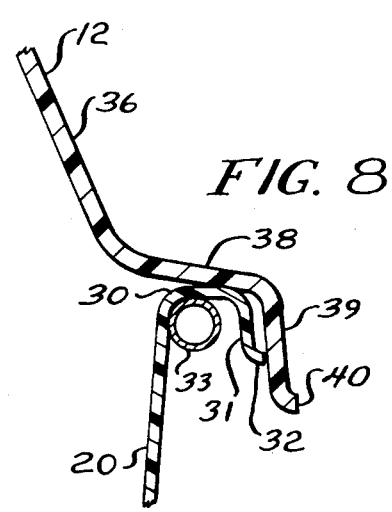
FIG. 8 is a fragmentary sectional view showing the cover in sealing relationship with the base.

FIGS. 6-8 illustrate the cover being lowered over the base. As the cover moves downwardly in the direction of the arrow A, the flange 39 of the cover moves alongside the flange 31 of the base. The flange 39 will eventually engage the lip 32 of the flange 31 of the base as shown in FIG. 7. As the cover continues to be lowered, the flange 39 of the cover will be flexed outwardly as indicated by the arrow B. The flange 31 of the base may also flex inwardly slightly. Contact between the flange 39 and the lip 32 is maintained as the cover is lowered until the shoulder 38 is supported by the rim 30 of the base. Since the flange 39 (and perhaps the flange 31) is deformed or flexed from its original, unstressed position, the resilience of the flange will urge the flange firmly against the lip 32 and will maintain a sealing relationship between the cover and the base.

When the cover is raised, the flange 39 will return to its original position. The flexibility and resilience of the cover and the base is such that the parts can be opened and closed repeatedly without decreasing the effectiveness of the seal.

The contact between the flange 39 of the cover and the lip 32 of the base provides a seal against water, dust, and foul weather and protects the contents within the enclosure of the base. The seal is provided integrally with the base and the cover and does not require any separate parts such as foam or rubber strips. The flexibility of the flanges 31 and 39 also permits the seal structure to accommodate dimensional variations between the base and the cover. These parts can therefore be made without exacting tolerances without adversely affecting the seal. The plastic parts are also weather-resistant, and the seal will last as long as the base and cover themselves.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A vehicle trailer comprising a trailer body having a bottom and an upwardly extending side wall providing an open-topped storage space, and a cover supportable by the body for closing the storage space, the cover having a top wall and a downwardly extending side wall, the upper end of the side wall of the base being generally U-shaped and including an outwardly extending rim portion and a downwardly and outwardly extending flange portion, the side wall of the cover including a generally outwardly extending shoulder portion which is engageable with the rim portion of the side wall of the base whereby the cover is supported by the base and a downwardly and outwardly extending flange portion which is engaged by the flange portion of the side wall of the base when the shoulder is supported by the rim to provide a seal between the cover and the base, at least one of the flange portions of the base side wall and the cover side wall being flexible whereby the flexible flange portion can flex as the flange portions engage each other.

2. The structure of claim 1 in which both of the flanges are flexible.

3. The structure of claim 1 in which the cover and the base are molded from plastic.

4. The structure of claim 3 in which the bottom of the flange on the base terminals in an outwardly extending lip which engages the flange on the cover when the cover is supported by the base to provide a seal between the cover and the base.

5. The structure of claim 1 in which the bottom of the flange on the base terminates in an outwardly extending lip which engages the flange on the cover when the cover is supported by the base to provide a seal between the cover and the base.

6. The structure of claim 1 including a reinforcing tube below the rim of the base between the side wall of the base and the flange of the base.

7. A seal structure for a storage container having a molded plastic base and a molded plastic cover, the base having a bottom and an upwardly extending side wall, the cover having a top and a downwardly extending side wall, the seal structure comprising (a) a support rim molded integrally on the base which extends generally outwardly from the side wall of the base and a flange molded integrally with the rim which extends downwardly and outwardly from the rim, (b) a shoulder molded integrally on the cover which extends generally outwardly from the side wall of the cover and which is supported by the rim of the base when the cover closes the base, and a flange molded integrally with the shoulder which extends downwardly and outwardly from the shoulder, the flange on the cover being engageable with the flange on the base when the cover is lowered over the base, at least one of the flanges being flexible as the flanges engage each other to permit the cover to be lowered until the shoulder of the cover is supported by the rim of the base.

8. The structure of claim 7 in which both of the flanges are flexible.

9. The structure of claim 7 in which the bottom of the flange on the base terminates in an outwardly extending lip which engages the flange on the cover when the cover is supported by the base to provide a seal between the cover and the base.

10. The structure of claim 7 including a reinforcing tube below the rim of the base between the side wall of the base and the flange of the base.

11. The structure of claim 7 in which the flange on the base terminates in an outer edge which engages the flange on the cover when the cover is supported by the base to provide a seal between the cover and the base.

12. The structure of claim 7 in which the base and the cover are rectangular.

* * * * *

UNITED STATES PATENT AND TRADEMARK OFFICE
CERTIFICATE OF CORRECTION

PATENT NO. : 4,502,725
DATED : March 5, 1985
INVENTOR(S) : Morris N. Wiant

It is certified that error appears in the above-identified patent and that said Letters Patent is hereby corrected as shown below:

Col. 3, line 46 change "terminals" to --terminates--.

Signed and Sealed this

Twenty-fifth Day of June 1985

[SEAL]

*Attest:*

DONALD J. QUIGG

*Attesting Officer*     *Acting Commissioner of Patents and Trademarks*